United States Patent [19]

Rodriguez et al.

[11] Patent Number: 5,667,909
[45] Date of Patent: Sep. 16, 1997

[54] ELECTRODES CONFIGURED FOR HIGH ENERGY DENSITY GALVANIC CELLS

[75] Inventors: Pedro Rodriguez, Ossining, N.Y.; Dennis Biegger, Morris Plains; Andrew Lenkiewicz, Hackensack, both of N.J.

[73] Assignee: Power Conversion, Inc., Elmwood Park, N.J.

[21] Appl. No.: 481,037

[22] Filed: Jun. 23, 1995

[51] Int. Cl.$^6$ ........................................ H01M 2/26
[52] U.S. Cl. .................... 429/127; 429/136; 429/161
[58] Field of Search ........................... 429/94, 127, 160, 429/161, 136; 29/623.3

[56] References Cited

U.S. PATENT DOCUMENTS

| | | | |
|---|---|---|---|
| 2,666,803 | 1/1954 | Kurlandsky | 429/160 X |
| 2,971,999 | 2/1961 | Jacquier | 429/160 X |
| 3,350,239 | 10/1967 | Stanimirovitch | 29/623.3 |
| 3,450,566 | 6/1969 | Solomon et al. | 429/136 X |
| 5,154,989 | 10/1992 | Howard et al. | 429/160 |
| 5,312,458 | 5/1994 | Muffoletto et al. | 429/161 X |

FOREIGN PATENT DOCUMENTS 2906853  8/1979  Germany ........................... 429/161

*Primary Examiner*—Stephen Kalafut
*Attorney, Agent, or Firm*—Breiner & Breiner

[57] ABSTRACT

A high density cell stack is provided utilizing a flexible cathode material having at least four sections in the form of a rectangle and flexible anode materials folded over each other at right angles. A suitable anode material is lithium and a suitable cathode material is manganese dioxide. The disclosed cell stacks are rapidly manufactured to provide high density cells with good mechanical stability and good stability against shorting.

9 Claims, 6 Drawing Sheets

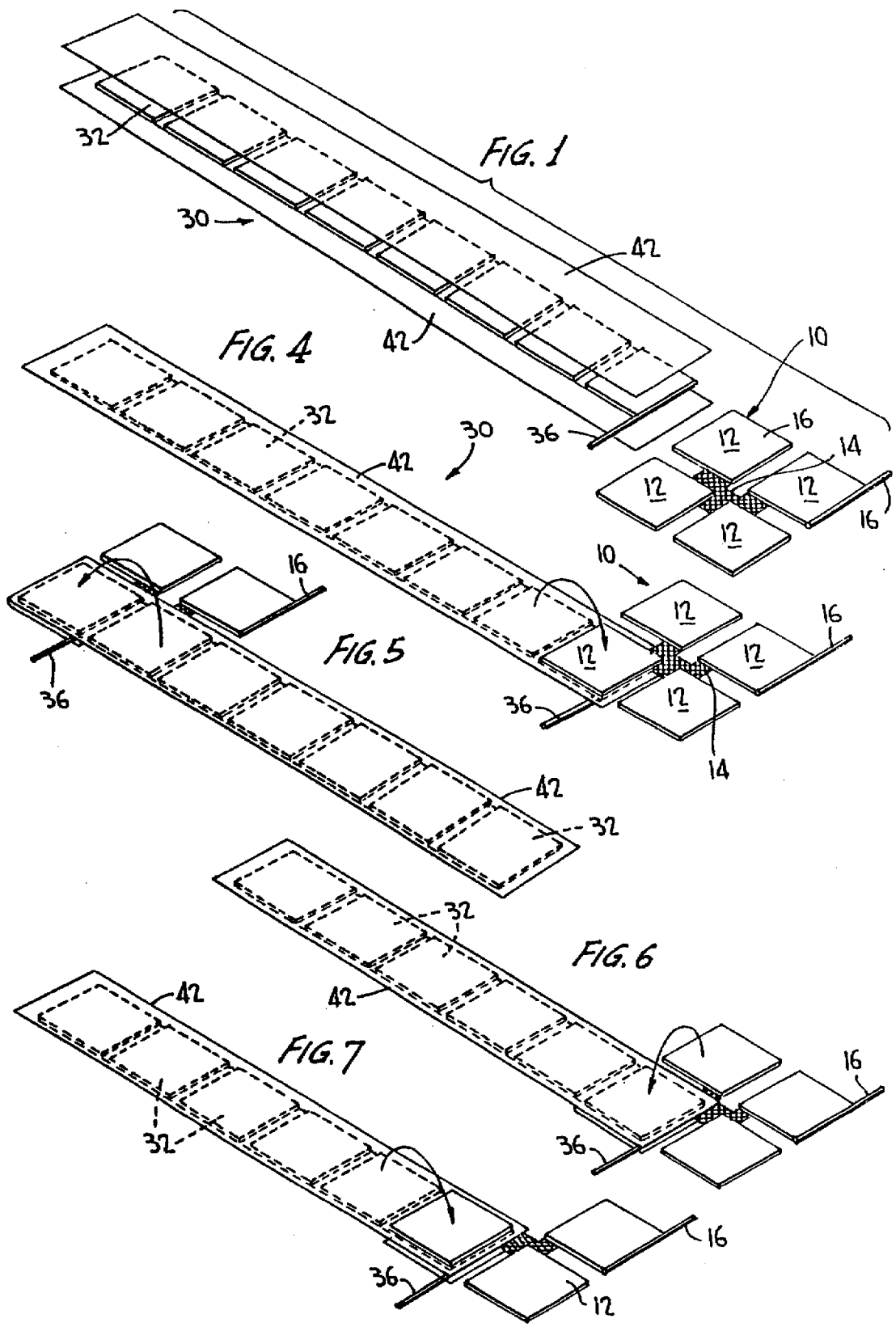

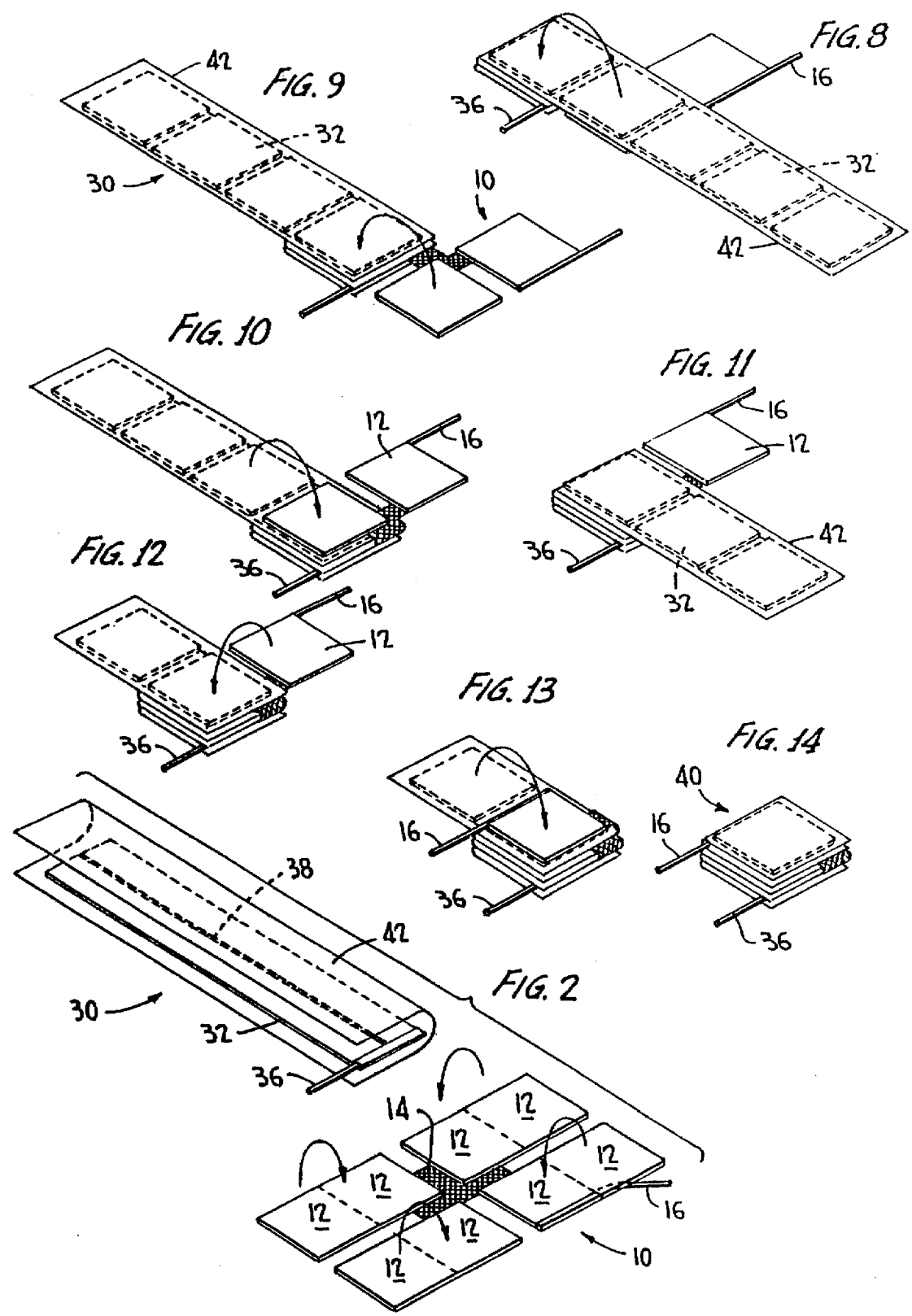

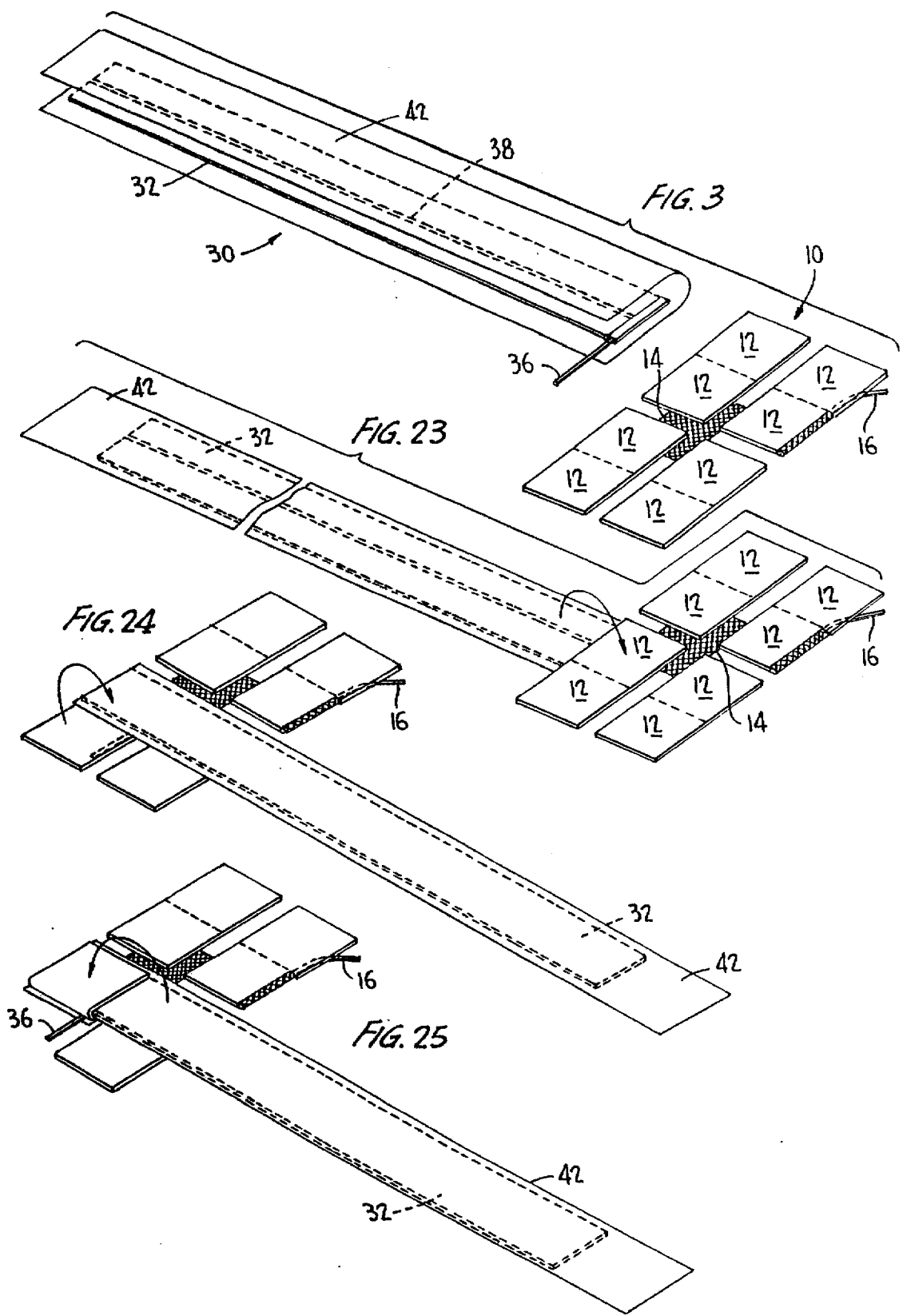

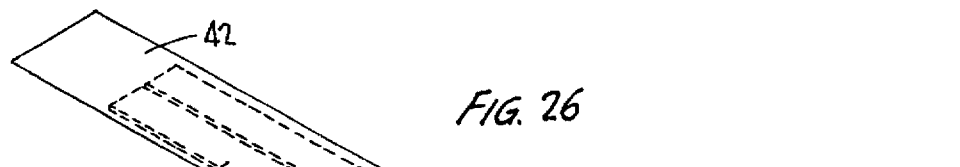
FIG. 26
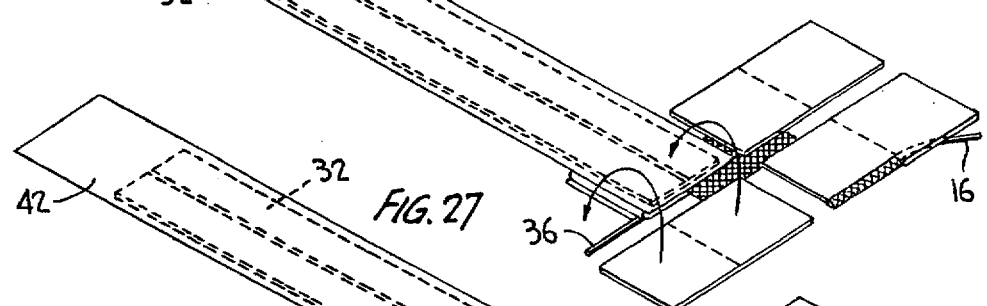
FIG. 27
FIG. 28
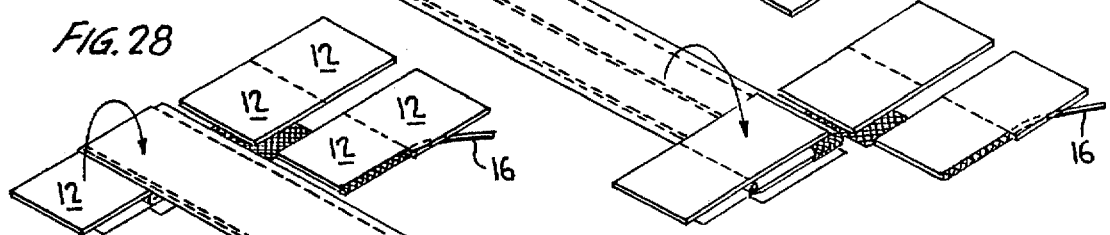
FIG. 29
FIG. 30
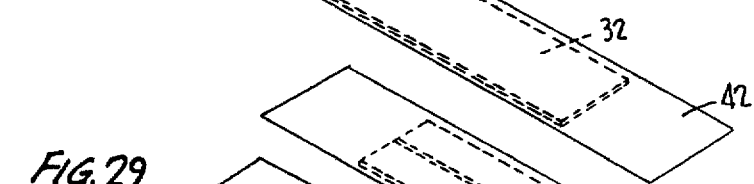
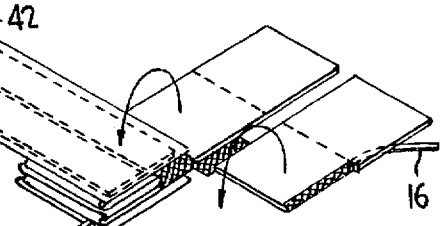
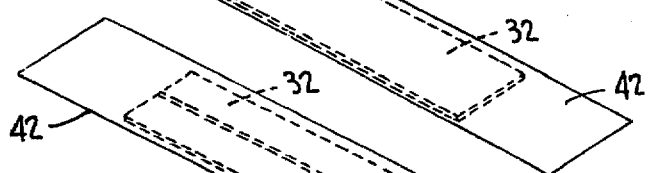
FIG. 31

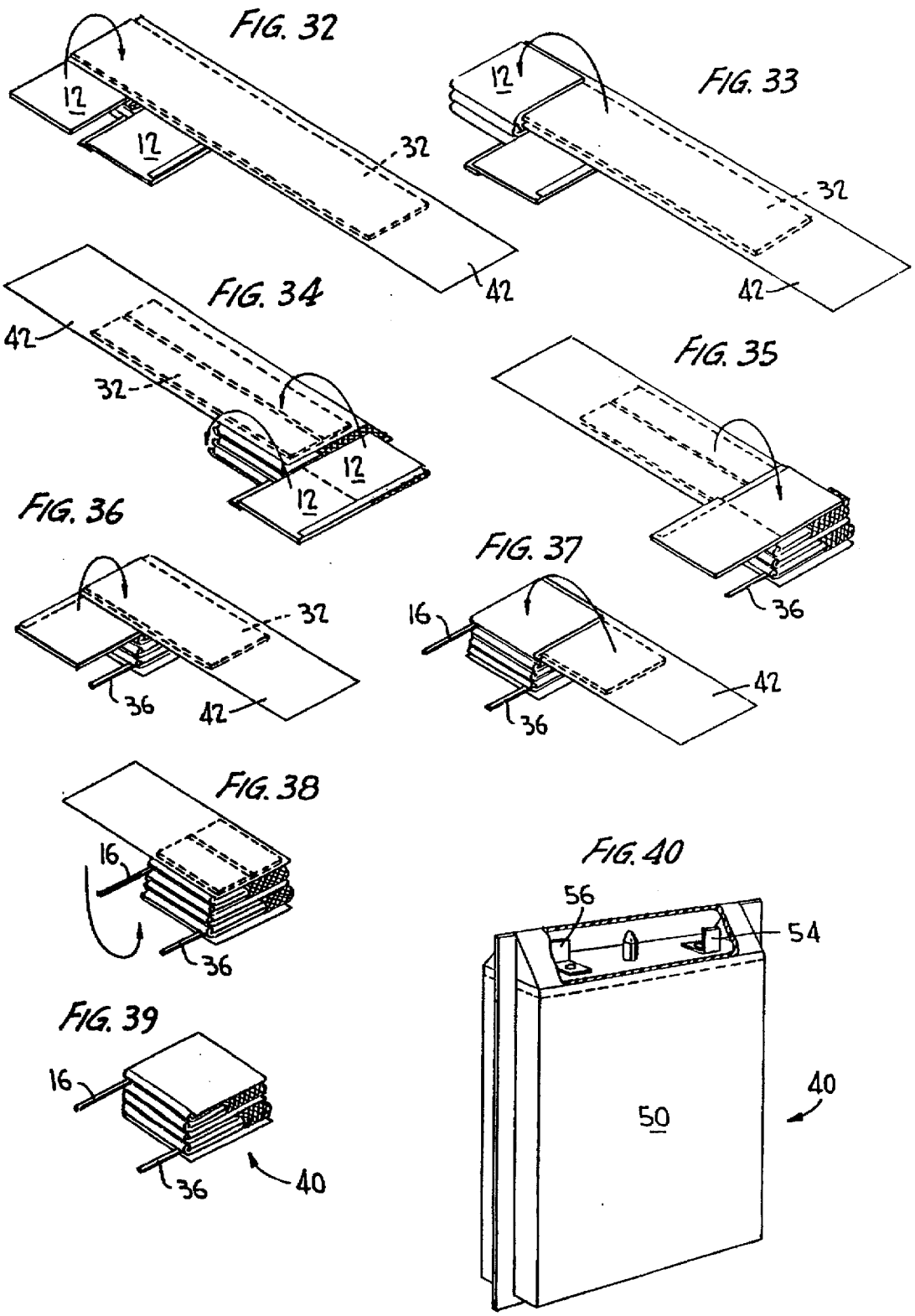

ELECTRODES CONFIGURED FOR HIGH ENERGY DENSITY GALVANIC CELLS

This application is related to application Ser. No. 08/305,439 filed Sep. 13, 1994 entitled "Folded Electrode Configuration For Galvanic Cells," commonly assigned now U.S. Pat. No. 5,525,441.

FIELD OF INVENTION

This invention relates to electrode configurations for electrochemical cells, commonly referred to as batteries, and to the batteries containing the electrodes. More particularly the invention relates to folded electrode configurations and to a method of manufacturing batteries utilizing the folded electrodes.

BACKGROUND OF THE INVENTION

In recent years the demand for high energy density batteries has increased. To provide high energy density batteries a plurality of anodes and cathodes separated by an electrolyte, contained in a separator material or a polymeric electrolyte, are arranged in stacks with the current being taken off from the electrodes with current collectors. It is desirable that these stacked cells can be rapidly fabricated while at the same time having assurance that the anode and cathodes are constructed to avoid direct electrical contact between the anode and cathodes, thereby shorting out the cells. Additionally, it is desirable that the stack of cells withstand the abuse received in their environment of use.

Accordingly, cell stacks have been fabricated from relatively flexible anodes and cathodes separated by a liquid or paste electrolyte contained in a flexible, porous separator material compatible with the electrolyte or separated by a solid polymer electrolyte which retains its structural integrity. For example, application WO 9407276-A1 describes an electrochemical cell stack comprising a continuous laminate web, having one continuous first polarity electrode layer, one continuous electrolyte layer, and a number of discrete second polarity electrode segments secured on top of the electrolyte layer in predetermined locations. The continuous laminate web is fan-folded at predetermined fold positions such that the second polarity electrode segments contact the electrolyte layer on the top and bottom sides of each of the second polarity electrode segments. The web forms a stack having first and second sides.

Additionally, U.S. Pat. No. 4,092,464 describes a high energy density flexible cell or battery capable of undergoing flexular stress with little effect on its discharge properties either during or after subjection to stress comprising a flexible anode folded over a cathode.

Commonly assigned application Ser. No. 08/305,439 filed Sep. 13, 1994 entitled "Folded Electrode Configuration For Galvanic Cells" describes high energy density cells or batteries which are relatively flexible, capable of rapid construction, have high integrity with regard to shorting out of the cells or battery with good electrolyte stability including leakage and which is of relatively low cost. The present related application describes other configurations based on the same concepts.

SUMMARY OF THE INVENTION

The present invention provides a means of forming a folded electrode configuration for use in primary and secondary (i.e., rechargeable) batteries which is readily manufacturable and provides a lower cost alternative to parallel plate construction for prismatic galvanic cells used in battery construction. A preferred cell configuration employs a planar anode in strip form and a plurality of cathodes in rectangular form. The cathodes have either a square or H-fold configuration. The electrodes when assembled are positioned at right angles to one another, whereby at least one layer of porous, electrically insulating separator material is placed between electrodes of opposite polarity. In an alternative, more preferred embodiment, one of the electrodes is encased in a separator envelope. If required by the mechanical properties of one or both electrodes, blow-off areas, i.e., areas where there is no electrochemically active material, may be spaced periodically along the electrode structure to allow folds to be made at regular intervals. During construction of the electrode structure, the electrodes are folded over each other at right angles to each other giving a prismatic electrode structure which may then be inserted in a prismatic electrode case. This folding operation can be either carried out by hand or by a mechanical assembly structure consisting of lever arms to make the device. Tabs are placed at selected locations on the electrodes so that when the folded electrode structure is completed, these tabs may be connected to electrical feed-throughs incorporated in the cell case.

In a particularly preferred embodiment, no blow-out areas are required on the electrodes since the electrodes are flexible and may be folded without degradation of their mechanical strength or electrical continuity. Incorporation of one of these electrodes in a separator envelope eliminates possible short circuits during the folding operation and obviates the need to maintain strict registration between the separator and electrodes during the folding operation.

This invention is particularly useful in primary lithium batteries since lithium is quite malleable and may be readily folded but it is also useful in other batteries using other metals such as aluminum or zinc which can also be folded. In the case of lithium, the electrode incorporates a current collector which may be a copper or nickel metal strip, or a foil laminate structure (Li/Cu/Li). Other areas of utility include secondary or rechargeable lithium batteries using liquid or polymeric electrolytes and lithium ion batteries in which lithium is intercalated into a host material such as carbon which has been deposited on a current collector. The preferred embodiment of this invention involves making a lithium/manganese dioxide primary cell where the cathode comprises manganese dioxide containing conductive diluents such as graphite and/or carbon with a binder such as polytetrafluroethylene (PTFE) on an aluminum expanded metal grid. Other grid materials such as stainless steel or nickel may also be employed. The electrode may employ one or more such grids or foils to provide electrical conductivity and mechanical strength in the electrode structure. The other electrode of the cell, the anode, consists of lithium metal foil containing a copper metal strip which acts as a current collector. The separator material when employed is preferably micro-porous polypropylene, formed into an envelope which completely encases the anode on three sides, leaving room on one end for the tab to exit the envelope. After folding the electrodes, the tabs are welded to electrical feed-throughs formed by rivets passing through a polymeric header assembly containing an electrolyte fill tube and heat sealed to a foil laminate envelope. After formation of these weldments, the envelope is heat sealed around the electrode structure. The electrochemical cell is then evacuated and filled with a non-aqueous electrolyte consisting of a lithium salt dissolved in a non-aqueous solvent which may be a mixture of non-aqueous, aprotic liquids such as dimethoxyethane, propylene carbonate, butylene carbonate, dioxolane, and the like. Typical lithium salts are lithium perchlorate, lithium hexafluroarsenate, lithium tetrafluorophosphate, lithium trifluoramethane sulfonate and lithium bis(trifluoromethylsulfonyl)imide.

As an alternative to the use of separator materials with liquid electrolytes, polymeric electrolytes may be employed between the electrodes to provide electrolytic conduction between the electrodes but preventing direct contact.

In still another alternative cell design, the folded electrolyte configuration is placed in a foil laminate pouch and the tabs which are covered with thermoplastic material are heat sealed in the seams of the pouch. The cell may be either filled with electrolyte before the final heat sealing of the seams or a needle or fine tube placed in the seam and the cell filled with electrolyte after the tabs are sealed in the seam of the pouch. The needle or fine tube is then withdrawn and the pouch sealed.

In still another embodiment, the prismatic electrode configuration is placed in a metallic, prismatic case, the tabs welded to glass-to-metal feed-throughs in a metallic header which is inserted in the case and the header welded to the case. The cell case is then evacuated through an electrolyte fill tube and the cell back filled with electrolyte. In this instance, a hermetic construction is achieved using the same components as employed in the two embodiments described above.

Other active solid cathode materials such as polycarbon monofluoride (CFx), iron disulfide ($FeS_2$) or cupric oxide (CuO), may also be employed in the cathode.

THE DRAWING AND DETAILED DESCRIPTION

In the drawings,

FIG. 1 is an exploded view of a first embodiment of the components of a high energy density lithium battery.

FIG. 2 is an exploded view of a second embodiment of the components of a high energy lithium battery.

FIG. 3 is an exploded view of a third embodiment of the components of a high energy lithium battery.

FIGS. 4–14 show the folding and stacking sequence used in fabricating an electrochemical cell stack utilizing the components shown in FIG. 1.

FIGS. 23–39 show the folding and stacking sequence used in fabricating an electrochemical cell stack utilizing the components shown in FIG. 3.

FIG. 40 is an illustration of the cell stack of FIG. 14 enclosed in a container consisting of a polymeric header and foil laminate sides.

Figure 15:
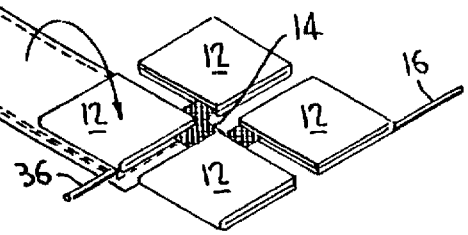
FIGS. 15–22 show the folding and stacking sequence used in fabricating an electrochemical cell stack utilizing the components shown in FIG. 2.
Figure 16:
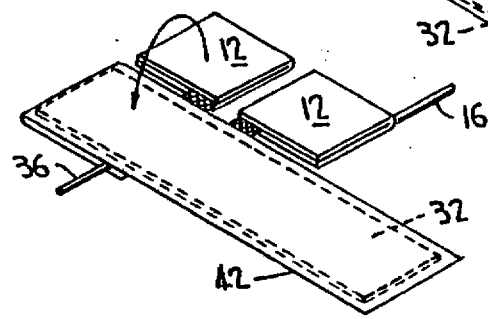
Figure 17:
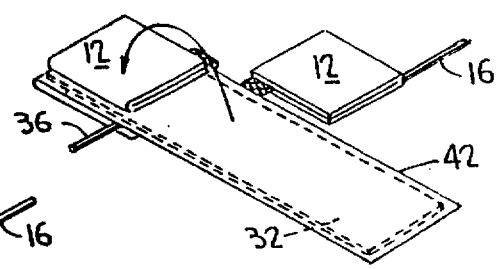
Figure 18:
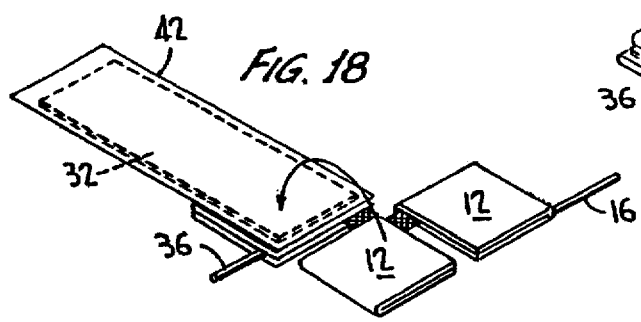
Figure 19:
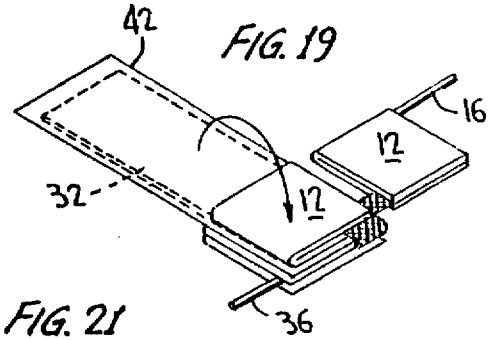
Figure 20:
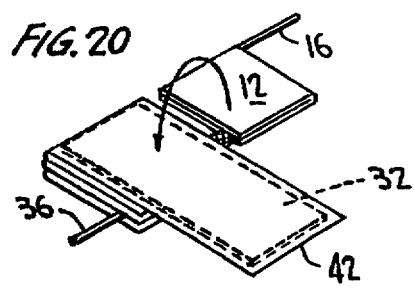
Figure 21:
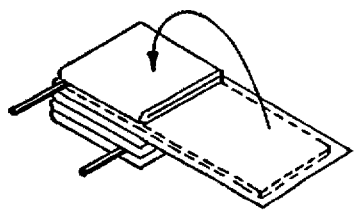

Referring to the drawing in greater detail, FIGS. 1–3 are exploded views of components of a cell stack, each configured according to the invention. Thus, in each of the configuration 10 is a flexible cathode material in sections 12 including current collector 14 imbedded in the flexible cathode material with tab 16 being attached to current collector 14 for take off of electrical current. In FIG. 1 the cathode material comprises four separate cathodes 12 in a square configuration with the corners being connected by the current collector 14. In FIG. 2 the cathode material comprises eight separate sections 12. The four end sections are then folded over onto themselves to provide a thick cathode material. With the folding, the cathode is substantially similar to the cathode shown in FIG. 1. In FIG. 3 the cathode is very similar to the cathode of FIG. 2. However, in this instance, as will be apparent hereinafter, the cathode sections are not folded over onto themselves. The anode 30 in each of the configurations of FIGS. 1–3 includes a flexible anode material 32. A current collector 38 is in contact with the anode material. Tab 36 is a take off for electrical current. In FIG. 1 Separators 42 are on each side of the cathode material 32, whereas in FIGS. 2 and 3 a folded separator material, which can be an envelope, is utilized.

FIGS. 4–14 illustrate the assembly of a cell stack 40 from the cell components of FIG. 1. As illustrated, the plurality of anodes in the anode strip are folded over the square cathode material and then the cathode is folded over an anode section at right angles in the sequence of FIGS. 4–13, to provide the cell stack 40 as shown in FIG. 14.

Figure 22:
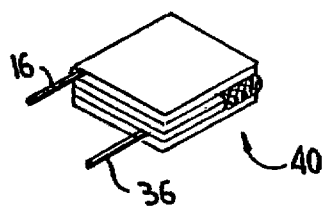

FIGS. 15–22 illustrate the folding sequence, again with the anode material and cathode material being folded at right angles to provide the cell stack 40 shown in FIG. 22. The cell stack of FIG. 22 differs from the cell stack of FIG. 14 in that the cathode material is thicker to provide a cell having different electrical characteristics.

FIGS. 23–39 illustrate the assembly of a cell stack using the components of FIG. 3. In this instance each section of the H-configured cathode material is folded over the anode strip in sequence to provide a anode material between each cathode section. This provides a cell stack 40 utilizing eight cathodes and nine anodes to provide a 17 layer cell stack.

The cell stacks 40 preferably are encased in a suitable casing 50 as shown in FIG. 40. The cell stack includes the cell casing 50 which can be of plastic or other non-conductive material and includes current take off members 54 and 56. The cell stack is approximately four inches in height and four inches in width. The thickness of the cell stack ranges from 0.15 to 0.65 inches. The design of the present cell provides compactness, stability of electrolyte which is impregnated in a separator material and good stability against electrical shorting of the stacked cells. Moreover, the cell stack can be rapidly manufactured to provide a low cost in the manufacture of high energy density cells having good stability.

As will be apparent, the cells, by utilizing the folding characteristics, can have more or fewer individual layers in the stack to provide the essential energy-density characteristics. The cells will operate with the voltage characteristics substantially similar to the cells shown in related application Ser. No. 08/305,439. The disclosure of that application being incorporated herein by reference.

Various modifications will be recognized by those skilled in the art based on the present teaching. Thus, although only select preferred embodiments have been specifically illustrated and described herein, it is to be understood that various modifications and embodiments can be utilized to provide the present invention without departing from the spirit of the invention and the scope of the appended claims.

It is claimed:

1. An electrochemical cell stack comprising:

(a) a segmented cathode material comprising four sections in the form of a rectangle, said four sections being connected together at their inner adjacent corners with a flexible current collector material;

(b) a strip of anode material including a current collector having flexibility sufficient to permit the strip to be folded over onto itself; and (c) non-conductive porous separator means comprising an electrolyte positioned between said cathode material and anode strip to prevent electrical contact between said cathode material and anode strip, said anode strip and cathode material being folded over onto each other at right angles to each other to provide a cell stack.

2. The cell stack of claim 1 wherein said cathode material is in a square configuration to provide four cathode sections and said cathode sections being separated by said separator means from four layers of anode material.

3. The cell stack of claim 1 wherein said cathode material is in an H-configuration whereby each of said four sections has a first and an end segment, the end segment of each section being folded over onto the first segment, and thereafter said anode strip and cathode material are folded over each other to provide said cell stack.

4. The cell stack of claim 1 wherein said non-conductive flexible separator material is a porous polymeric material.

5. The cell stack of claim 4 wherein said non-conductive flexible separator material is in the form of an envelope.

6. The cell stack of claim 1 wherein said anode is lithium.

7. The cell stack of claim 6 wherein said lithium anode is a laminate comprising in order a first lithium foil layer, a copper current collector strip and a second lithium foil layer.

8. The cell stack of claim 7 wherein said cathode material comprises manganese dioxide as the active material.

9. The cell stack of claim 1 wherein the electrolyte is a liquid electrolyte.

* * * * *